(12) United States Patent
Saon et al.

(10) Patent No.: US 10,262,260 B2
(45) Date of Patent: *Apr. 16, 2019

(54) METHOD AND SYSTEM FOR JOINT TRAINING OF HYBRID NEURAL NETWORKS FOR ACOUSTIC MODELING IN AUTOMATIC SPEECH RECOGNITION

(71) Applicant: International Business Machines Corporation, Armonk, NY (US)

(72) Inventors: George A. Saon, Stamford, CT (US); Hagen Soltau, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/434,643

(22) Filed: Feb. 16, 2017

(65) Prior Publication Data

US 2017/0161608 A1 Jun. 8, 2017

Related U.S. Application Data

(63) Continuation of application No. 14/313,554, filed on Jun. 24, 2014, now Pat. No. 9,665,823.

(60) Provisional application No. 61/912,693, filed on Dec. 6, 2013.

(51) Int. Cl.
*G06N 3/08* (2006.01)
*G06N 3/04* (2006.01)

(52) U.S. Cl.
CPC ............ *G06N 3/08* (2013.01); *G06N 3/0454* (2013.01)

(58) Field of Classification Search
None
See application file for complete search history.

(56) References Cited

U.S. PATENT DOCUMENTS

| 5,867,816 | A | 2/1999 | Nussbaum |
| 7,254,538 | B1 | 8/2007 | Hermansky et al. |
| 7,613,663 | B1 | 11/2009 | Commons et al. |
| 9,665,823 | B2 * | 5/2017 | Saon .................. G06N 3/08 |

FOREIGN PATENT DOCUMENTS

EP 2221805 A1 8/2010

OTHER PUBLICATIONS

T.N. Sainath et al., "Improvements to Deep Convolutional Neural Networks for LVCSR," Automated Speech Recognition and Understanding (ASRU) Workshop, Dec. 8, 2013, 6 pages, Olomouc, Czech Republic.

(Continued)

*Primary Examiner* — Alan Chen
(74) *Attorney, Agent, or Firm* — Rahan Uddin; Ryan, Mason & Lewis, LLP

(57) ABSTRACT

Systems and methods for training networks are provided. A method for training networks comprises receiving an input from each of a plurality of neural networks differing from each other in at least one of architecture, input modality, and feature type, connecting the plurality of neural networks through a common output layer, or through one or more common hidden layers and a common output layer to result in a joint network, and training the joint network.

16 Claims, 7 Drawing Sheets

(56) References Cited

OTHER PUBLICATIONS

H. Soltau et al., "Joint Training of Convolutional and Non-Convolutional Neural Networks," International Conference on Acoustics, Speech and Signal Processing (ICASSP), May 4, 2014, 3 pages, Florence, Italy.

J.G. Fiscus, "A Post-Processing System to Yield Reduced Word Error Rates: Recognizer Output Voting Error Reduction (ROVER)," IEEE Workshop on Automatic Speech Recognition and Understanding, 1997, pp. 347-354.

A. Krieger et al., "Multi-Feature Fusion Using Neural Networks for Underwater Acoustic Signal Processing," Signals, Systems and Computers, 1991, pp. 1119-1122.

H. Soltau et al., "The IBM Attila Speech Recognition Toolkit," Spoken Language Technology Workshop (SLT), 2010 IEEE, 2010, pp. 97-102.

Y. Bengio et al., "Convolutional Networks for Images, Speech, and Time-Series," ResearchGate, Nov. 1997, pp. 1-14.

G. Hinton et al., "Deep Neural Networks for Acoustic Modeling in Speech Recognition," IEEE Signal Processing Magazine, Nov. 2012, pp. 82-97, vol. 29, No. 6.

O. Abdel-Hamid et al., "Applying Convolutional Neural Networks Concepts to Hybrid NN-HMM Model for Speech Recognition," IEEE International Conference on Acoustics, Speech and Signal Processing (ICASSP), Mar. 25-30, 2012, pp. 4277-4280.

A. Graves et al., "Speech Recognition with Deep Recurrent Neural Networks," IEEE International Conference on Acoustics, Speech and Signal Processing (ICASSP), May 26-31, 2013, pp. 6645-6649.

List of IBM Patents or Patent Applications Treated as Related.

\* cited by examiner

100

400

METHOD AND SYSTEM FOR JOINT TRAINING OF HYBRID NEURAL NETWORKS FOR ACOUSTIC MODELING IN AUTOMATIC SPEECH RECOGNITION

TECHNICAL FIELD

The field generally relates to methods and systems for training neural networks and, in particular, to methods and systems for training of hybrid neural networks for acoustic modeling in automatic speech recognition.

BACKGROUND

Recently, deep neural networks (DNNs) and convolutional neural networks (CNNs) have shown significant improvement in automatic speech recognition (ASR) performance over Gaussian mixture models (GMMs), which were previously the state of the art in acoustic modeling. Furthermore, performance improvements can be obtained by combining one or more neural networks which differ in type (e.g., DNN, CNN, recurrent neural network, bi-directional network), input features (e.g., perceptual linear prediction (PLP), Mel-frequency cepstral coefficient (MFCC), Log-mel spectra, etc.) or modality (e.g., audio features, visual features, etc.). This combination can be done in several ways.

Feature fusion: here the feature vectors from the different feature representations are concatenated and form a single feature vector which is fed into a single neural network. The drawback here is that only one network is trained which can be suboptimal if the different feature representations or modalities are best modeled by different neural network architectures (e.g., image features are best modeled with convolutional networks whereas speech features such as PLP are best modeled with DNNs).

Model fusion: the outputs of two or more neural networks that are trained separately on the same or on different feature representations are combined together to form a single output. The combination can be done using either simple weighted linear or log-linear rules or by training a new classifier on top which performs the score combination. This classifier can also be a neural network. The drawback here is that the component neural networks whose scores are combined are trained in isolation instead of being trained such as to optimize a common objective function.

Word-level fusion: here separate automatic speech recognition (ASR) systems are trained with separate neural networks and separate feature streams, and the outputs are combined at the word sequence level by aligning the individual word sequences and by selecting the words with the most votes within each alignment bin. Like before, the drawback here is that the separate networks are trained in isolation and do not optimize a common objective function.

SUMMARY

In general, exemplary embodiments of the invention include methods and systems for training neural networks and, in particular, to methods and systems for training of hybrid neural networks for acoustic modeling in automatic speech recognition.

According to an exemplary embodiment of the present invention, a method for training networks comprises receiving an input from each of a plurality of neural networks differing from each other in at least one of architecture, input modality, and feature type, connecting the plurality of neural networks through a common output layer, or through one or more common hidden layers and a common output layer to result in a joint network, and training the joint network.

According to an exemplary embodiment of the present invention, a system for training networks, comprises an input module capable of receiving an input from each of a plurality of neural networks differing from each other in at least one of architecture, input modality, and feature type, a connection module capable of connecting the plurality of neural networks through a common output layer, or through one or more common hidden layers and a common output layer to result in a joint network, and a training module capable of training the joint network.

According to an exemplary embodiment of the present invention, a computer program product for training networks comprises a computer readable storage medium having program instructions embodied therewith, the program instructions executable by a processor to cause the processor to perform a method comprising receiving an input from each of a plurality of neural networks differing from each other in at least one of architecture, input modality, and feature type, connecting the plurality of neural networks through a common output layer, or through one or more common hidden layers and a common output layer to result in a joint network, and training the joint network.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
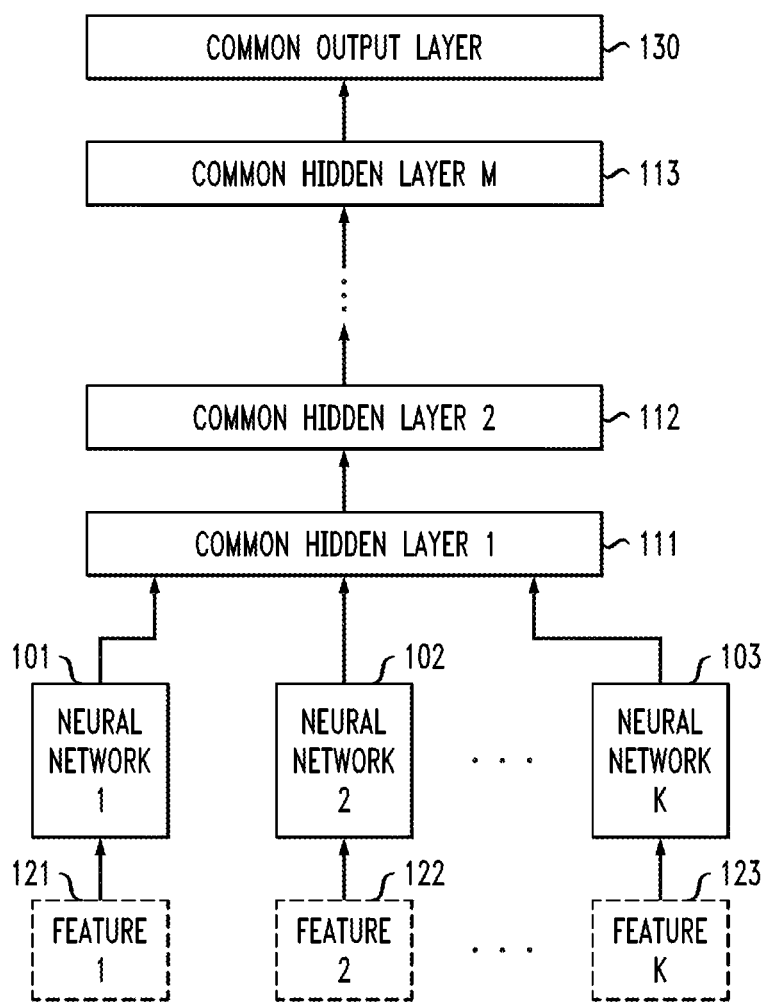
FIG. 1 illustrates the architecture of a hybrid network in accordance with an embodiment of the present invention.

Exemplary embodiments of the invention will now be discussed in further detail with regard to systems and methods for training neural networks and, in particular, to a systems and methods for training of hybrid neural networks for acoustic modeling in automatic speech recognition. This invention may, however, be embodied in many different forms and should not be construed as limited to the embodiments set forth herein.

The information captured in each layer of a neural network varies from more general to more specific concepts. For example, in speech, lower layers focus more on speaker adaptation and higher layers focus more on discrimination. With multi-scale CNN/DNN, inputs from different layers of a neural network are combined to explore if complementarity between different layers could potentially improve results further. This idea, known as multi-scale neural networks, has been explored before for computer vision.

Specifically, the output from 2 fully connected and 2 convolutional layers are combined. This output is fed into 4 more fully-connected layers, and the entire network is trained jointly. This can be thought of as combining features generated from a DNN-style and CNN-style network. In experimental applications, the same input features, (i.e., log-mel features) were used for both DNN and CNN streams. Results are shown in Table 1.

Referring to Table 1, a gain is observed by combining DNN and CNN features. However, the improvement comes at the cost of a large parameter increase, and the same gains may be achieved by increasing feature maps in the CNN alone (see Table 1). Combining CNNs and DNNs with different types of input features which are complimentary, could potentially show more improvements.

TABLE 1

Multi-scale CNN vs. DNN

| Method | Params | WER |
|---|---|---|
| CNN alone | 5.6M | 18.9 |
| Multi-scale CNN/DNN | 9.5M | 18.6 |

Embodiments of the present invention explore jointly training two or more neural networks which can differ in type, architecture, input modality or input features to optimize a common objective function related to speech recognition performance.

In accordance with an embodiment of the present invention, two or more neural networks are connected by means of one or more common hidden layers and one common output layer. Alternatively, the two or more neural networks are connected by one common output layer without a common hidden layer. In accordance with an embodiment of the present invention, the resulting hybrid neural network is trained such as to optimize a given objective function (e.g., mean-squared error, cross-entropy, lattice-based discriminative sequence loss, etc.). The component networks that are joined can differ in architecture and/or functionality (e.g., regular multi-layer perceptrons, convolutional neural networks, recurrent neural networks, etc.), input modality (e.g., speech features, visual features) and feature type (e.g., PLP, MFCC, Log-mel, image features). The resulting network is then used as an acoustic model in an ASR system. The advantage of this approach over known approaches is that the component networks are trained such as to optimize a common objective function instead of being trained in isolation.

In accordance with embodiments of the present invention, the networks are trained jointly on different modalities (or feature streams), all networks can be used after they are trained, and the hybrid network can be used directly as an acoustic model. There is also the possibility of using the hybrid network for feature extraction. In accordance with an embodiment, a hybrid network is composed of multiple networks which are trained jointly on different feature streams versus having separate networks trained separately.

The architecture of a hybrid network in accordance with an embodiment of the present invention is shown in FIG. 1. In this figure, there are K component neural networks 101, 102, ... 103 joined by M common hidden layers 111, 112, ... 113 and one common output layer 130. In accordance with an embodiment, K is a natural number ≥2, and M is a natural number ≥0. Each component network has its own separate feature input denoted by Feature 1 (121), Feature 2 (122) ... Feature K (123).

Figure 2:
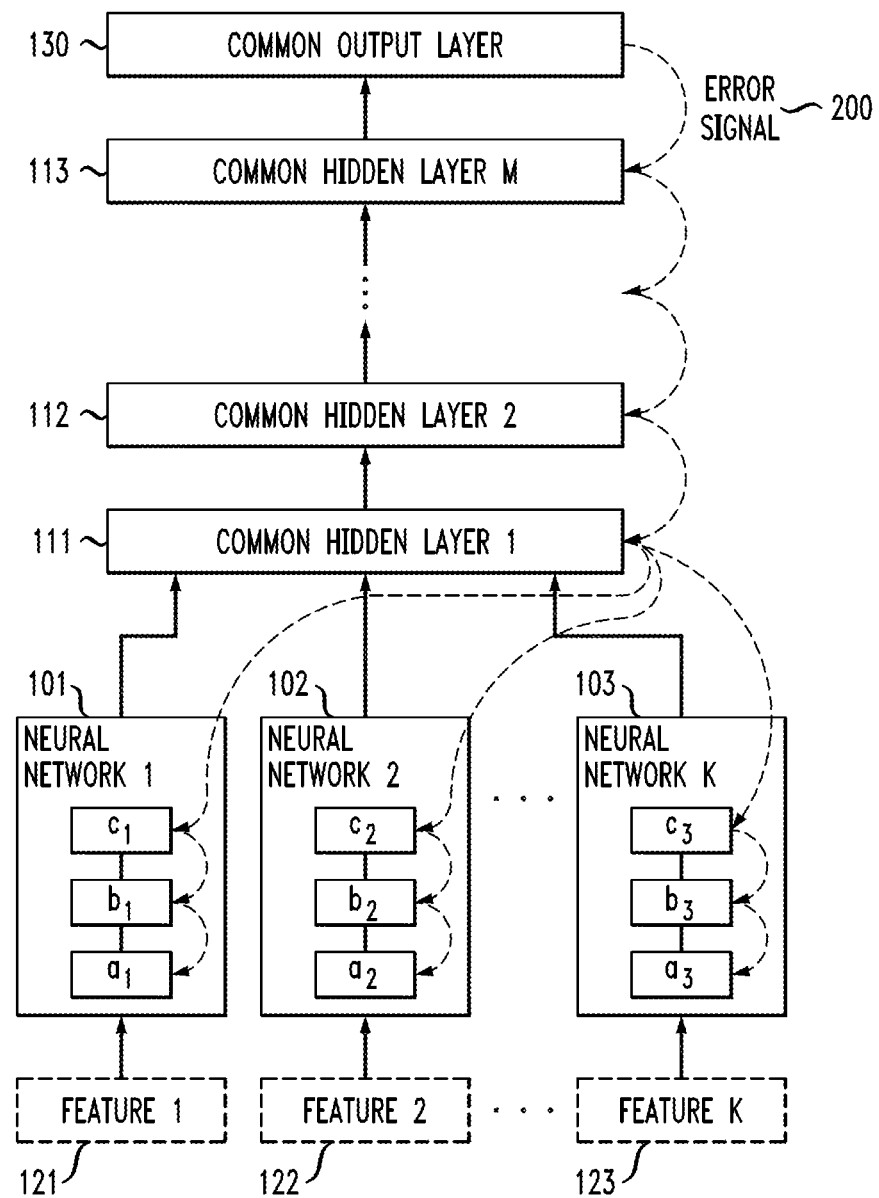
FIG. 2 illustrates the flow of an error signal in a hybrid network in accordance with an embodiment of the present invention.

The networks are trained in the following way. In accordance with an embodiment of the present invention, training data is denoted as $(x\_1, y\_1), (x\_2, y\_2), \ldots, (x\_T, y\_T)$, where $x\_t$ denotes the K-tuple $(x\_t1, \ldots, x\_tK)$ and $y\_t$ denotes the target value corresponding to $x\_t$. $y\_t$ is a discrete value for classification and a real value for function estimation (regression). In the case of neural networks for ASR, $y\_t$ represents the context-dependent hidden Markov model (HMM) state at time t. Consider the error function E, which measures the classification or regression error of the hybrid network. E can be mean squared error, cross-entropy or some other suitable function which measures the discrepancy between the output of the network and the target $y\_t$. The network is trained by backpropagating the partial derivative of E with respect to the network output (referred to herein as "error signal") through the common hidden layers 111, 112, ... 113 and through the component neural networks 1 ... K (101, 102, ... 103). The weight matrices of the component networks and of the common layers are updated through gradient descent where the gradient is computed using the backpropagated error signal. The flow of the error signal 200 in accordance with an embodiment of the present invention, is shown in FIG. 2. FIG. 2 further shows the error signal 200 backpropagated through layers $a_1, b_1, c_1, a_2, b_2, c_2, \ldots a_k, b_k, c_k$ of each neural network 101, 102, ... 103.

The neural network architecture and training methodology in accordance with an embodiment of the present invention was demonstrated experimentally on two speech recognition databases: 50 hours of English broadcast news (BN) speech and 300 hours of English conversational telephone speech (CTS). A deep neural network and a convolutional neural network were first trained in isolation for the two tasks which serve as baselines for ASR system comparison. For both English BN and English CTS, the input features for the DNNs are given by perceptual linear prediction (PLP) cepstral frames transformed with vocal tract length normalization (VTLN) and feature-space maximum likelihood linear regression (FMLLR).

Frames within a ±5 temporal context window are concatenated together and form the input to the DNN for English CTS. The FMLLR frames are further transformed with feature-space maximum mutual information (FMMI) and are augmented with finite differences up to order 3 and form the input to the DNN for English BN. The input features for the CNN are given by Log-mel spectra computed using a Mel filterbank with 40 (for BN) and 32 (for CTS) units, respectively, and augmented with finite differences up to order 2.

The DNN for English BN has 1 input layer with 160 units, 5 hidden layers with 1024 units and 1 output layer with 3000 units. The DNN for English CTS has 1 input layer with 440 units, 5 hidden layers with 2048 units and 1 output layer with 8260 units.

The CNN for English BN has 1 input layer with 120 units, 2 convolutional layers with 128 and 256 units, respectively, 3 hidden layers with 1024 units and one output layer with 3000 units. The CNN for English CTS has 1 input layer with 96 units, 2 convolutional layers with 128 and 256 units, respectively, 4 hidden layers with 2048 units and 1 output layer with 8260 units.

Figure 3:
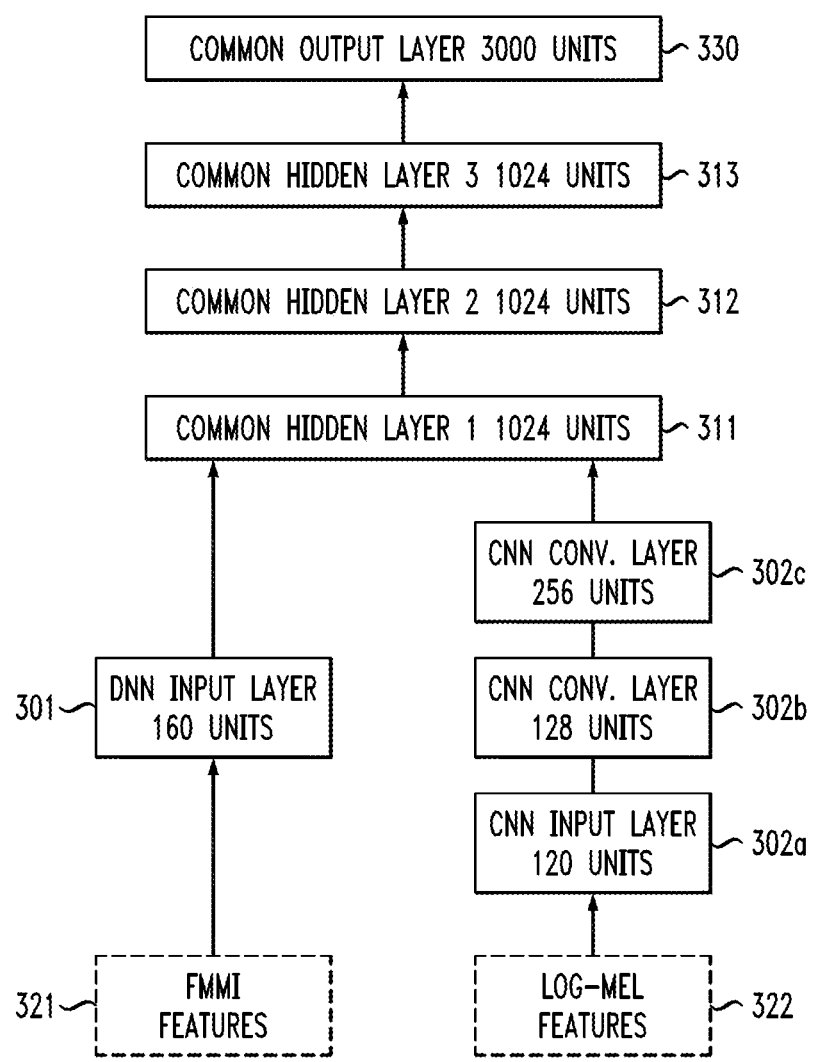
FIG. 3 illustrates the architecture of a hybrid network for English Broadcast News (BN) in accordance with an embodiment of the present invention.

Referring to FIG. 3, in accordance with an embodiment, the hybrid network 300 for English BN has the following configuration. The DNN part has 1 input layer 301 with 160 units, which correspond to the fMMI features 321 augmented with finite differences up to order 3. The CNN part has 1 input layer 302a with 120 units, which correspond to the Log-Mel features 322 from a Mel filterbank with 40 filters augmented with finite differences up to order 2, and two convolutional layers 302b, 302c with 128 and 256 units, respectively. There are 3 common hidden layers 311, 312, 312 with 1024 units and 1 common output layer 330 with 3000 units. The input layer 301 of the DNN part and the last convolutional layer 302c of the CNN part connect to the first common hidden layer 311.

Figure 4:
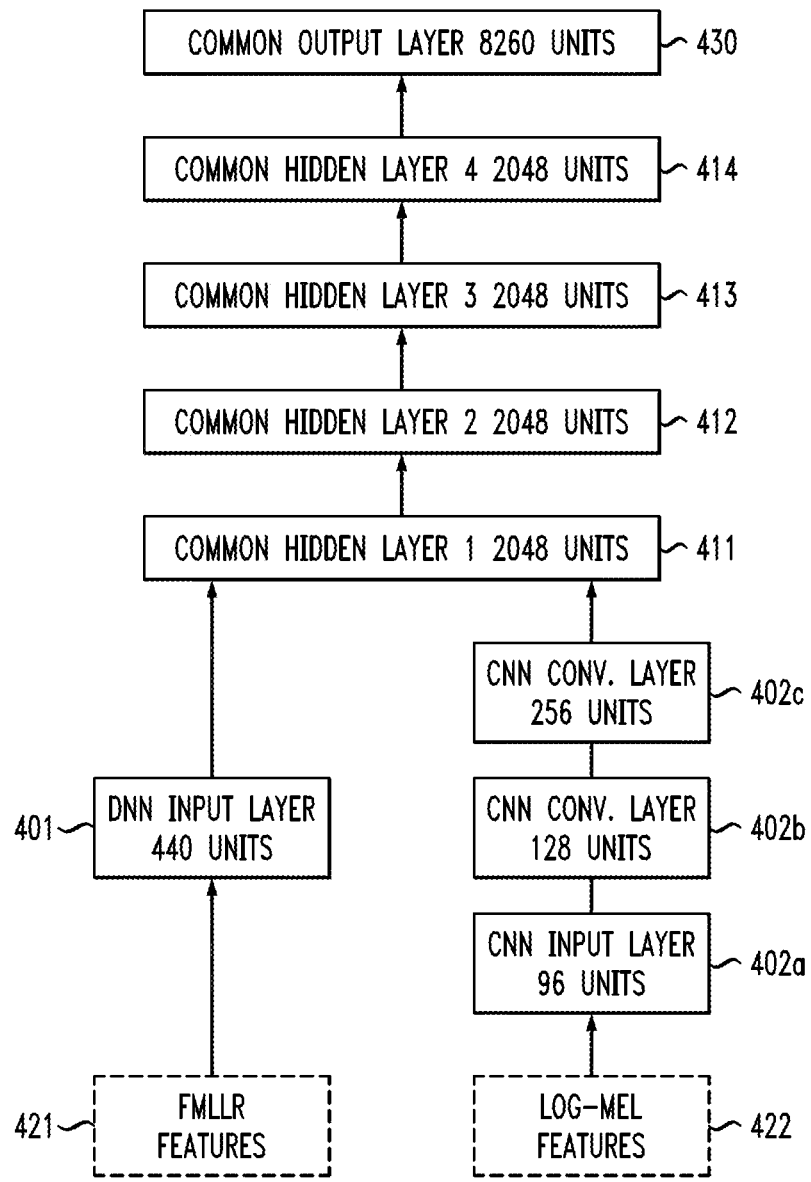
FIG. 4 illustrates the architecture of a hybrid network for English conversational telephone speech (CTS) in accordance with an embodiment of the present invention.

Referring to FIG. 4, in accordance with an embodiment, the hybrid network 400 for English CTS has the following configuration. The DNN part has 1 input layer 401 with 440 units, which correspond to the concatenated FMLLR features 421 within a window of ±5 frames. The CNN part has 1 input layer 402a with 96 units, which correspond to the Log-Mel features 422 from a Mel filterbank, with 32 filters augmented with finite differences up to order 2, and two convolutional layers 402b, 402c with 128 and 256 units, respectively. There are 4 common hidden layers 411, 412, 413 and 413 with 2048 units each and 1 common output layer 430 with 8260 units. The input layer 401 of the DNN part and the last convolutional layer 402c of the CNN part connect to the first common hidden layer 411.

In accordance with an embodiment, all networks are trained with stochastic gradient descent and a cross-entropy criterion on mini-batches of 250 frames. The frames are fully randomized within a 25 hour window. The targets for the training frames are given by the context-dependent HMM states obtained by aligning the acoustic data with an HMM-GMM acoustic model.

The training converges after 10-15 sweeps (epochs) through the training data. Table 2 below shows the word error rates for the various ASR systems.

TABLE 2

| System | WER English BN | WER English CTS |
| --- | --- | --- |
| DNN | 17.3% | 14.1% |
| CNN | 16.6% | 14.2% |
| DNN/CNN Hybrid | 15.5% | 13.2% |

In the experiments on the two speech recognition databases (English BN speech 50 hours and English CTS (Switchboard) 300 hours), a regular multi-layer perceptron (MLP) was combined with a convolutional neural network CNN. The input layer of the MLP and the last convolutional layer of the CNN were connected to a common hidden layer which was followed by 4 more hidden layers and one output layer. The entire hybrid network was trained by minimizing a cross-entropy objective function. As can be seen from Table 2, the hybrid network achieves a word error rate (WER) of 15.5% versus 16.6% for the best component network on English BN and 13.2% versus 14.1% for the best component network on Switchboard.

Figure 5:
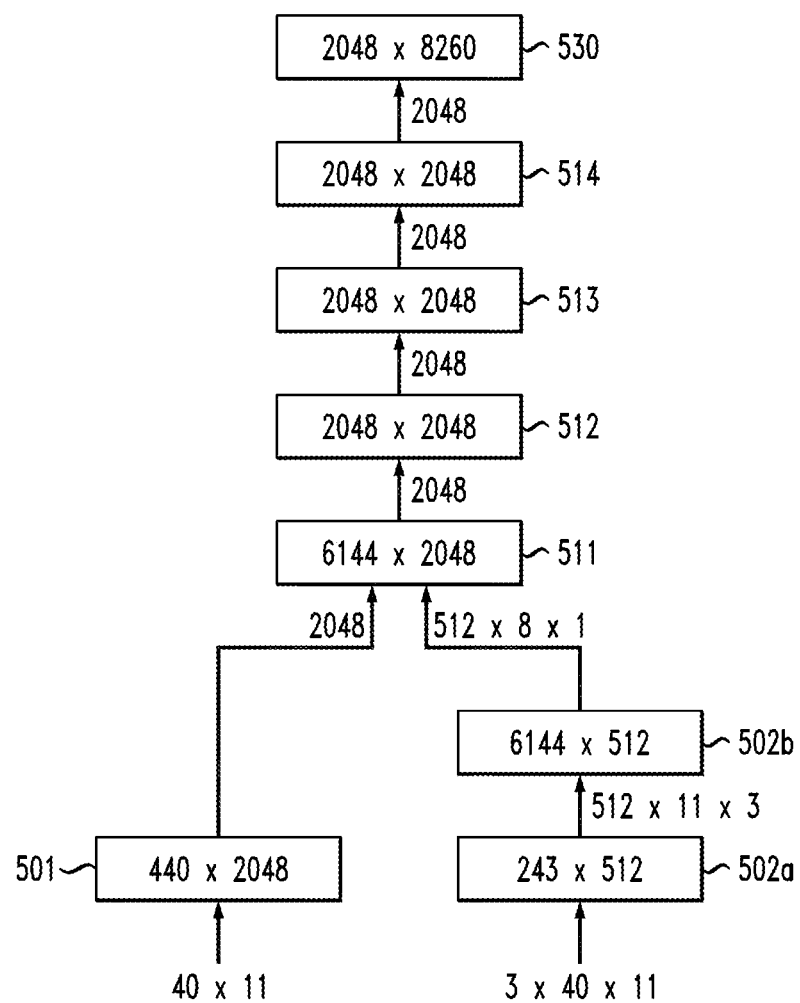
FIG. 5 illustrates a joint MLP/CNN model in accordance with an embodiment of the present invention.

While a regular MLP (or CNN) is normally a linear sequence of layers, a model, in accordance with an embodiment of the present invention, includes a graph structure of layers. Each layer can receive inputs from multiple layers, and each layer can send its output to multiple layers. In the forward pass, the outputs of all input layers are combined (joined). In the backward pass, the gradients of all output layers are summed up before back-propagating the gradient. The graph structure is not restricted to the hidden layers only; the models also allow for multiple input features and outputs. An example of such a network is shown in FIG. 5, which illustrates a joint MLP/CNN model, in accordance with an embodiment of the present invention. In this case, the network 500 consists of two convolutional layers 502a, 502b (right side) and a non-convolutional layer 501 (left side) that share four hidden layers 511, 512, 513 and 514, plus the output layer 530.

Referring to FIG. 5, the matrix dimensions of the weights are marked inside the boxes. The size of the inputs for each layer are marked next to the arrows. The non-convolutional inputs are 40-dim FMLLR features in a context window of 11 frames (40×11). For the convolutional part, 40-dim log-mel features are used together with their Δ's and ΔΔ's in a context window of 11 frames.

In the following, potential benefits of a graph-structured neural network are discussed.

Joint Training of MLPs and CNNs

For a conventional MLP, multiple input features can be used by combining the feature matrices into one single input matrix. This is not the case for CNNs. CNNs achieve shift invariance by applying a pooling operation of the output values. In order to achieve shift invariance in the feature domain, the features should be topographical, such as log-mel features. On the other hand, state-of-the-art GMM and MLP based systems may make use of more advanced speaker adaptive features such as FMLLR or fMMI features. These features are not topographical and therefore are not used with a CNN. The neural network graph structure allows use of such features by having CNN and MLP layers in parallel as shown in FIG. 5. Since most layers are shared, the joint MLP/CNN configuration shown in FIG. 5 has only about 10% more parameters than the corresponding CNN.

Multi-GPU (Graphics Processing Unit) Usage

With the graph structure, one layer can be split into n parallel parts (striping). For example, a 2048×7000 output layer can be split into two 2048×3500 layers (in parallel). Each matrix multiplication can run in parallel on separate devices. Combining the output of each layer is simply a cudaMemcpy2D call, where the pitch parameter is used to specify the target position of the combined matrix. The cudaMemcpy2D can be used directly to copy memory between devices without any extra device management.

Multi-Task Learning

The graph structure allows multiple targets to be specified. An example of multiple targets is the use of different decision trees. Multiple target/output layers for neural networks is a form of multi-task learning and can be used to improve generalization. For example, speech enhancement features can be used. The graph structure would look like a regular neural net with two parallel output layers, one for the state posteriors (with softmax and cross-entropy) and another one for clean target features (with sigmoid and mean square error (MSE)).

The following experiments are carried out on the Switchboard (SWB) task. The training set is a 300 hr SWB-1 corpus. Error rates are reported for a Hub5-2000 test set. First, a regular training recipe is used to establish a GMM baseline. The model comes with standard state-of-the-art techniques including, for example, VTLN, FMLLR, MLLR, Linear Discriminant Analysis (LDA), Semi-tied Covariance (STC), plus feature and model space discriminative training. The system has 350000 Gaussians with 8260 states and its performance is summarized in Table 3.

TABLE 3

| GMM baseline error rate on HUB5-2000 | |
| --- | --- |
| SI ML | 23.2% |
| SI bMMI | 21.4% |
| SI fMPE + bMMI | 18.9% |
| SA fMPE + bMMI | 14.5% |

MLP, CNN, and Jointly Trained MLP/CNN

In accordance with embodiments of the present invention, neural nets can be trained with layer-wise back-propagation. The weights are randomly initialized. The initial step size is $5 \times 10^{-3}$ and is reduced by half every time the performance on a held-out set does not improve. The training data is randomized at the frame-level for each 30 hr chunk. The mini-batch size is 256 frames. The MLP has six layers 501, 511, 512, 513, 514 and 530 (left branch of FIG. 5), while the CNN has one more layer (right branch of FIGS. 5) 502a, 502b, 511, 512, 513, 514 and 530. Each conventional hidden layer has 2048 nodes 511, 512, 513, and 514, while the two convolutional layers 502a, 502b use 512 nodes each. The MLP uses 40-dim FMLLR features with a temporal context of 11 frames (40×11). For the CNN, 40-dim VTL-warped log-mel features are used together with their Δ and ΔΔ features. The temporal context for the CNN features is 11 frames.

The configuration of the CNN layers is shown in Table 4. For the first layer, an overlapping window of 9×9 is applied to the log-mel input stream. According to an embodiment, pooling operates over 3 output values. Since 40 log-mels are used with a temporal context of 11 frames, 32×3 windows are obtained. After applying a max operation over a non-overlapping window of 3×1, 11×3 windows are obtained. Applying an overlapping window of 4×3 from the second CNN layer 502b, 8×1 windows form the input for the conventional layer 511 that fuses the MLP with the CNN (see FIG. 5). The input dimensionality for the first layer is 3×9×9=243 and for the second CNN layer, 512×4×3=6144 (number of outputs from previous layer times number of windows).

In FIG. 5, the dimensions of the inputs and outputs are shown on the arrows, and the dimensions of the weight matrices are shown in the oval boxes. 40 logmels×11 frames comprise an initial input to boxes 501 and 502a. With respect to box 502b, by applying a 9×9 convolution window, a 32×3 window is obtained (the dimensions are the number of positions that the 9×9 window can fit into the 40×11 window). Then, by applying a 3×1 pooling window, an 11×3 window is obtained, and there are 512 of such windows. As a result, the input to the second convolutional layer 502b is 512×11×3.

Then, a 4×3 convolutional window is applied over the 11×3 input window, which results in an 8×1 window, and there are 512 of 8×1 windows. As a result, the output from the second convolutional layer 502b, which is the input for the conventional layer 511 that fuses the MLP with the CNN, is 512×8×1=4096.

TABLE 4

Configuration for first and second CNN layer

| | Feature domain | | Temporal domain | |
| --- | --- | --- | --- | --- |
| | Size | Shift | Size | Shift |
| CNN #0 | | | | |
| Windows | 9 | 1 | 9 | 1 |
| Pooling | 3 | 3 | 1 | 1 |
| CNN #1 | | | | |
| Windows | 4 | 1 | 3 | 1 |
| Pooling | 1 | 1 | 1 | 1 |

In Table 5, the performance of various neural net models from experiments conducted in accordance with embodiments of the invention is summarized. First, the models were trained with standard backpropagation and cross entropy as objective functions. The models were then retrained with Hessian-free sequence training. The MLP itself exhibits better results than the best GMM (12.3% vs. 14.5%) and another 0.5% improvement is gained by switching to a CNN. The jointly trained MLP/CNN improves the error rate from 11.8% to 11.2%.

TABLE 5

Neural nets on HUB5-2000

| Model | Cross Entropy | Hessian-free sMBR |
| --- | --- | --- |
| MLP | 13.8% | 12.3% |
| CNN | 13.2% | 11.8% |
| MLP/CNN | 12.8% | 11.2% |

Joint Training with I-Vectors

In the next experiment conducted in accordance with embodiments of the invention, I-Vectors are added to the jointly trained model. I-Vectors may be a form of speaker adaptation for neural nets. In accordance with an embodiment of the present invention, I-Vectors can be used to augment regular FMLLR features to feed in extra speaker information when training neural nets. With conventional MLPs used for the experiments, a 5-6% relative improvement was seen on top of MLPs with speaker adaptive features on a SWB task similar to the one used herein. Since I-Vector derived features are not topographical, CNNs are not required to be used. On the other hand, the CNN outperformed the MLP by 0.5% and the jointly trained model is 1.1% better than the MLP, so embodiments of the invention contemplate ways of how to add I-Vectors to CNNs. The graph structure for the jointly trained model in accordance with an embodiment of the present invention facilitated the addition of I-Vectors to CNNs.

A text-independent GMM with 2048 components is trained on the same training corpus that is used to train the neural nets. The frontend for the GMM uses the same features as the MLP: 40-dimensional FMLLR features. 100-dimensional I-Vectors for every speaker are extracted and appended to the input stream for the MLP. This brings the total input for the MLP to 11×40+100=540 features. Experiments performed based on an MLP setup with FMLLR features on the same task as set forth herein reported an error rate reduction from 12.5% to 11.9% after sequence training.

The results for the joint CNN/MLP in accordance with an embodiment of the present invention are shown in Table 6.

After sequence training, the error rate improves from 11.2% to 10.4% for the jointly trained MLP/CNN with I-Vectors. This shows that the improvements on the MLP setup carry over to the more elaborate joint MLP/CNN model and demonstrates the effectiveness of a model in accordance with an embodiment of the present invention.

TABLE 6

Jointly trained MLP/CNN with I-Vectors, Error rates on HUB5-2000

| Model | Cross Entropy | Hessian-free sMBR |
|---|---|---|
| MLP/CNN | 12.8% | 11.2% |
| MLP/CNN + I-Vector | 12.1% | 10.4% |

Comparison with System Combination

The jointly trained MLP/CNN can be seen as a form of system combination, where the outputs of the first MLP hidden layer get combined with the outputs of the second CNN layer. As a contrast experiment, it can be seen how much would be gained from combining separate MLP and CNN models. Since recognizer output voting error reduction (ROVER) does not necessarily work well when combining only two systems, score fusion can be used, where the acoustic scores from both models are averaged. The error rate for the system combination of separate MLP (12.3%) and CNN (11.8%) is 11.2%—the same as for the jointly trained model.

The same experiment was repeated including the I-Vector configuration. In this case, the separate models have error rates of 11.9% (MLP+I-Vector) and 11.2% (CNN). Score fusion of both models resulted in an error rate of 10.5%, slightly worse than the jointly trained model with 10.4%.

The full gain of system combination can be attained with only one jointly trained model. When a jointly trained model is used, it is not necessary to train two separate models, reducing training time for neural nets (even on GPUs). Furthermore, during decoding only one acoustic score computation needs to be done, whereas score fusion will double the acoustic score computation time. Also, the jointly trained model has only about 10% more parameters than the CNN alone, significantly less than the separate MLP and CNN.

Embodiments of the present invention propose to jointly train two or more neural networks that can differ in type and functionality. Known solutions train acoustic models corresponding to the various networks separately and perform model combination at the score-level or word-level. Embodiments of the present invention improve on known methods because the model and system combination become an integral part of the training procedure. The model and system combination works in concert with the training of the component neural networks in order to optimize a common objective function.

An embodiment of the present invention works by first defining the joint architecture where the component neural networks are joined by common hidden layers and one output layer. The joint network is trained by backpropagating the error gradient through the common layers and then through the component networks and by updating the weights of the common layers and of the component networks through stochastic gradient descent (or other methods such as second-order optimization).

Figure 6:
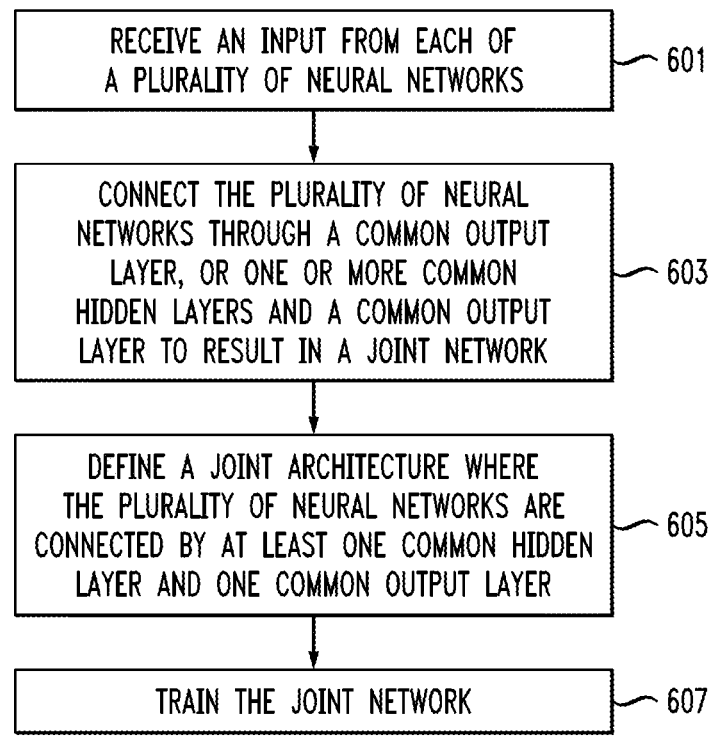
FIG. 6 is a flow diagram of a method for training networks, according to an exemplary embodiment of the invention.

Referring to FIG. 6, a flow diagram of a method for training networks, according to an embodiment of the present invention, is shown. The method 600 comprises receiving an input from each of a plurality of neural networks at block 601. The networks differ from each other in at least one of architecture, input modality, and feature type. The method further comprises at block 603, connecting the plurality of neural networks through a common output layer, or through one or more common hidden layers and a common output layer to result in a joint network, and, at block 607, training the joint network. The joint network can be used as an acoustic model in an ASR system, and training can be performed jointly on different modalities and/or feature streams.

The method may further include, at block 605, defining a joint architecture where the plurality of neural networks are connected by at least one common hidden layer and one common output layer. In accordance with an embodiment, training the joint network may comprise backpropagating an error signal through the common hidden layer and the one common output layer and through the plurality of neural networks. The error signal may be a partial derivative of an error function which measures classification or regression error of the joint network. Training the joint network can also include updating weights of the common hidden layer, the one common output layer and the plurality of neural networks through stochastic gradient descent and/or second-order optimization.

A first neural network of the plurality of neural networks may comprise a DNN and an input layer connected to the common hidden layer, and a second neural network of the plurality of neural networks may comprise a CNN and a convolutional layer connected to the common hidden layer.

Figure 7:
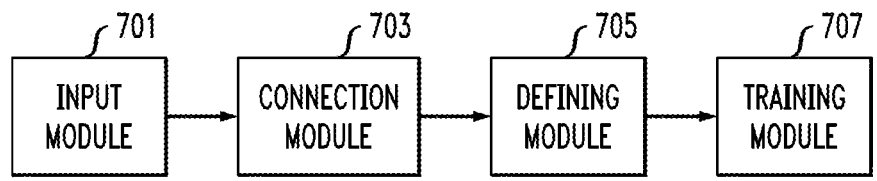
FIG. 7 is high-level diagram showing detail of a system for training networks, according to an exemplary embodiment of the invention.

Referring to FIG. 7, which is a high-level diagram of a system 700 for training networks, according to an embodiment of the present invention, the system includes an input module 701 capable of receiving an input from each of a plurality of neural networks differing from each other in at least one of architecture, input modality, and feature type, a connection module 703 capable of connecting the plurality of neural networks through a common output layer, or through one or more common hidden layers and a common output layer to result in a joint network, and a training module 707 capable of training the joint network. The training module 707 can be capable of performing the training jointly on different modalities and/or feature streams. The system 700 may further comprise a defining module 705 capable of defining a joint architecture where the plurality of neural networks are connected by at least one common hidden layer and one common output layer.

In accordance with an embodiment of the present invention, the training module 707 is capable of performing the training by backpropagating an error signal through the common hidden layer and the one common output layer and through the plurality of neural networks. The training module may further be capable of performing the training by updating weights of the common hidden layer, the one common output layer and the plurality of neural networks through stochastic gradient descent and/or second-order optimization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
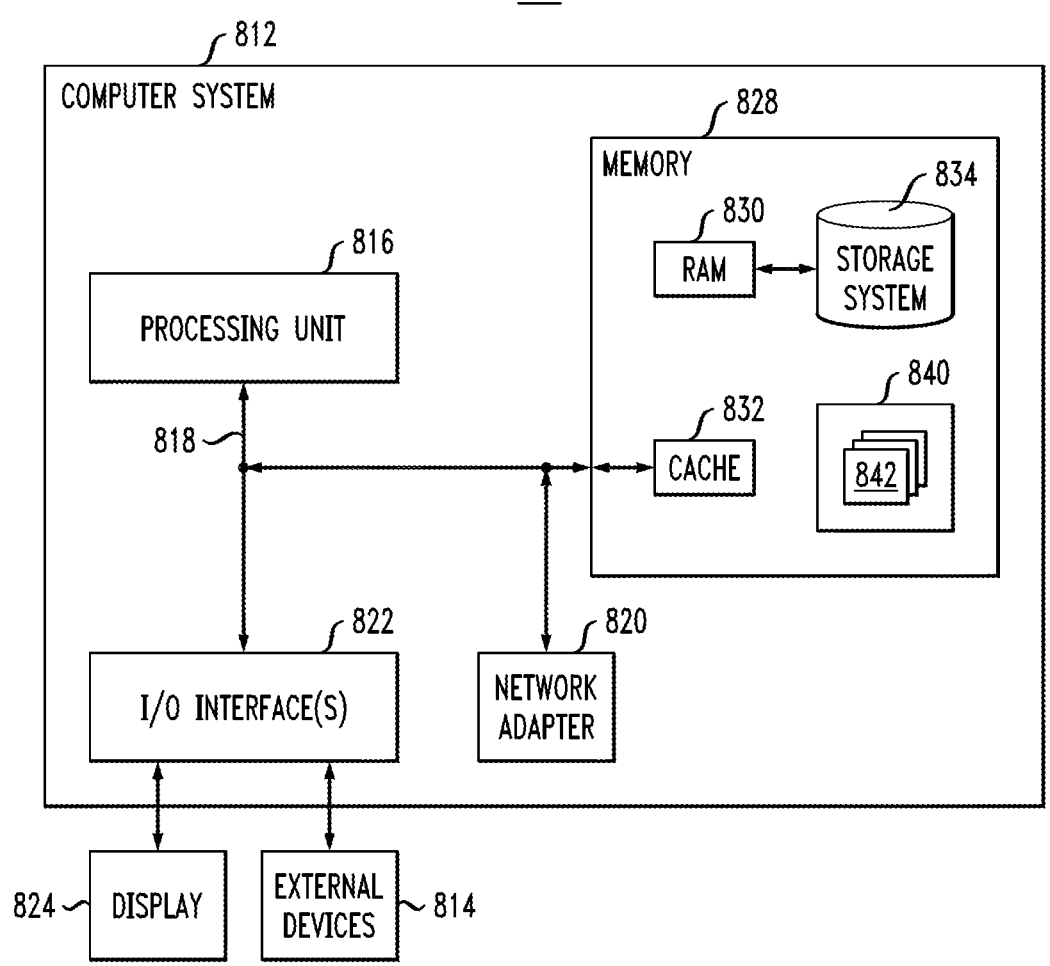
FIG. 8 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for training networks, the method comprising:
   receiving an input from each of a plurality of neural networks differing from each other in at least one of architecture, input modality, and feature type;
   connecting the plurality of neural networks through a common output layer, or through one or more common hidden layers and a common output layer to result in a joint network;
   training the joint network; and
   defining a joint architecture where the plurality of neural networks are connected by at least one common hidden layer and one common output layer;
   wherein training the joint network comprises backpropagating an error signal through one or more of the at least one common hidden layer and the one common output layer; and
   wherein the steps of the method are performed by a computer system comprising a memory and at least one processor coupled to the memory.

2. The method according to claim 1, wherein the error signal is a partial derivative of an error function which measures classification or regression error of the joint network.

3. The method according to claim 1, wherein a neural network of the plurality of neural networks comprises a convolutional layer connected to the at least one common hidden layer.

4. The method according to claim 1, wherein the training is performed jointly on at least one of different modalities and feature streams.

5. The method according to claim 1, wherein the plurality of neural networks comprise a deep neural network and convolutional neural network.

6. A method for training networks, the method comprising:
   receiving an input from each of a plurality of neural networks differing from each other in at least one of architecture, input modality, and feature type;
   connecting the plurality of neural networks through a common output layer, or through one or more common hidden layers and a common output layer to result in a joint network;

training the joint network; and defining a joint architecture where the plurality of neural networks are connected by at least one common hidden layer and one common output layer;

wherein training the joint network comprises updating weights of one or more of the at least one common hidden layer, the one common output layer and the plurality of neural networks through gradient descent; and wherein the steps of the method are performed by a computer system comprising a memory and at least one processor coupled to the memory.

7. A method for training networks, the method comprising:

receiving an input from each of a plurality of neural networks differing from each other in at least one of architecture, input modality, and feature type;

connecting the plurality of neural networks through a common output layer, or through one or more common hidden layers and a common output layer to result in a joint network;

training the joint network; and defining a joint architecture where the plurality of neural networks are connected by at least one common hidden layer and one common output layer;

wherein training the joint network comprises updating weights of one or more of the at least one common hidden layer, the one common output layer and the plurality of neural networks through optimization; and wherein the steps of the method are performed by a computer system comprising a memory and at least one processor coupled to the memory.

8. A method for training networks, the method comprising:

receiving an input from each of a plurality of neural networks differing from each other in at least one of architecture, input modality, and feature type;

connecting the plurality of neural networks through a common output layer, or through one or more common hidden layers and a common output layer to result in a joint network;

training the joint network; and defining a joint architecture where the plurality of neural networks are connected by at least one common hidden layer and one common output layer;

wherein a neural network of the plurality of neural networks comprises an input layer connected to the at least one common hidden layer; and wherein the steps of the method are performed by a computer system comprising a memory and at least one processor coupled to the memory.

9. A system for training networks, the system comprising:

an input module capable of receiving an input from each of a plurality of neural networks differing from each other in at least one of architecture, input modality, and feature type;

a connection module capable of connecting the plurality of neural networks through a common output layer, or through one or more common hidden layers and a common output layer to result in a joint network;

a training module capable of training the joint network; and a defining module capable of defining a joint architecture where the plurality of neural networks are connected by at least one common hidden layer and one common output layer;

wherein the training module is capable of performing the training by backpropagating an error signal through one or more of the at least one common hidden layer and the one common output layer.

10. The system according to claim 9, wherein the error signal is a partial derivative of an error function which measures classification or regression error of the joint network.

11. The system according to claim 9, wherein a neural network of the plurality of neural networks comprises a convolutional layer connected to the at least one common hidden layer.

12. The system according to claim 9, wherein the training module is capable of performing the training jointly on at least one of different modalities and feature streams.

13. A system for training networks, the system comprising:

an input module capable of receiving an input from each of a plurality of neural networks differing from each other in at least one of architecture, input modality, and feature type;

a connection module capable of connecting the plurality of neural networks through a common output layer, or through one or more common hidden layers and a common output layer to result in a joint network;

a training module capable of training the joint network; and a defining module capable of defining a joint architecture where the plurality of neural networks are connected by at least one common hidden layer and one common output layer;

wherein the training module is capable of performing the training by updating weights of one or more of the at least one common hidden layer, the one common output layer and the plurality of neural networks through gradient descent.

14. A system for training networks, the system comprising:

an input module capable of receiving an input from each of a plurality of neural networks differing from each other in at least one of architecture, input modality, and feature type;

a connection module capable of connecting the plurality of neural networks through a common output layer, or through one or more common hidden layers and a common output layer to result in a joint network;

a training module capable of training the joint network; and a defining module capable of defining a joint architecture where the plurality of neural networks are connected by at least one common hidden layer and one common output layer;

wherein the training module is capable of performing the training by updating weights of one or more of the at least one common hidden layer, the one common output layer and the plurality of neural networks through optimization.

15. A system for training networks, the system comprising:

an input module capable of receiving an input from each of a plurality of neural networks differing from each other in at least one of architecture, input modality, and feature type;

a connection module capable of connecting the plurality of neural networks through a common output layer, or through one or more common hidden layers and a common output layer to result in a joint network;

a training module capable of training the joint network; and a defining module capable of defining a joint architecture where the plurality of neural networks are connected by at least one common hidden layer and one common output layer;

wherein a neural network of the plurality of neural networks comprises an input layer connected to the at least one common hidden layer.

16. A computer program product for training networks, the computer program product comprising a computer readable storage medium having program instructions embodied therewith, the program instructions executable by a processor to cause the processor to perform a method comprising:

receiving an input from each of a plurality of neural networks differing from each other in at least one of architecture, input modality, and feature type;

connecting the plurality of neural networks through a common output layer, or through one or more common hidden layers and a common output layer to result in a joint network;

training the joint network; and defining a joint architecture where the plurality of neural networks are connected by at least one common hidden layer and one common output layer;

wherein training the joint network comprises backpropagating an error signal through one or more of the at least one common hidden layer and the one common output layer.

* * * * *